United States Patent
Hartenstein et al.

[11] 3,852,265
[45] Dec. 3, 1974

[54] 2',3'-O-LOWER ALKYLIDENE OR CYCLOHEXYLIDENE PERIPLORHAMNOSIDE COMPOUNDS

[75] Inventors: Johannes Hermann Hartenstein, Wittental; Gerhard Satzinger, Im. Mattenbuhl, both of Germany

[73] Assignee: Warner-Lambert Company, Morris Plains, N.J.

[22] Filed: Oct. 5, 1972

[21] Appl. No.: 295,384

[52] U.S. Cl. .............................. 260/210.5, 424/182
[51] Int. Cl. .......................................... C07c 173/00
[58] Field of Search ................................ 260/210.5

[56] References Cited
UNITED STATES PATENTS
3,462,528  8/1969  Voigtlander et al. ............ 260/210.5
3,471,470  10/1969  Heider et al. ..................... 260/210.5

*Primary Examiner*—Johnnie R. Brown
*Assistant Examiner*—Cary Owens
*Attorney, Agent, or Firm*—Albert H. Graddis; Frank S. Chow

[57] ABSTRACT

Periplorhamnoside derivatives of the general formula

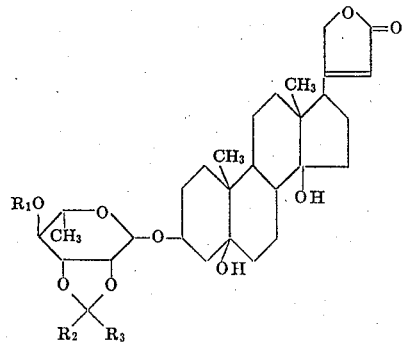

wherein $R_1$ may be hydrogen, methyl, ethyl, methoxymethyl, ethoxymethyl or the acyl residue of a carboxylic acid having 1 to 5 carbon atoms, $R_2$ and $R_3$ may be equal or different, each, representing a lower alkyl or, together with the common carbon atom, form a 5 or 6 membered alicyclic ring. The compounds of the present invention possess cardiotonic activity.

6 Claims, No Drawings

2',3'-O-LOWER ALKYLIDENE OR CYCLOHEXYLIDENE PERIPLORHAMNOSIDE COMPOUNDS

Periplorhamnoside derivatives of the general formula

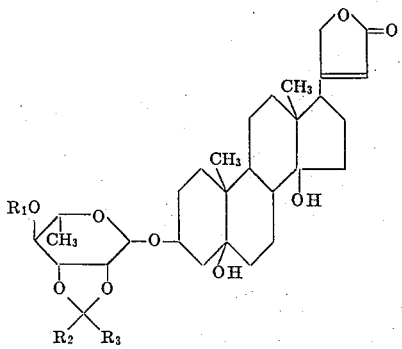

wherein $R_1$ may be hydrogen, methyl, ethyl, methoxymethyl, ethoxymethyl or the acyl residue of a carboxylic acid having 1 to 5 carbon atoms, $R_2$ and $R_3$ may be equal or different, each representing a lower alkyls or, together with the common carbon atom, form a 5 or 6 membered alicyclic ring. These derivatives permit oral administration of compounds which have a cardiotonic effect.

Periplorhamnoside, the α-L-rhamnoside of the periplogenin, is found in the seeds of *Antiaris toxicaria*, Lesch (Reichstein et al., Helv. 47, 2164 (1964) and in the flowers and leaves of *Convallaria majalis* L. (Kubelka et al., Monatsh. Chem., 48, 1262 (1967) and can also be obtained by means of partial synthesis from convallatoxin (Reichstein et al., Helv. 46, 117 (1963) or periplogenin. Due to the structure of its aglycon (methyl group linked to C-10) the periplorhamnoside is interesting for its position intermediate between the cardiac glycosides of the digitalis type and of the strophanthus type. It surpasses convallatoxin in its biological action but is, like the latter, absorbed only to a small extent upon enteral administration.

Most surprisingly it has now been found that the compounds according to the invention show a good enteric effectiveness, to some extent they are even more effective in enteral than in parenteral application which means that for the first time the periplorhamnoside can be utilized for oral therapy of a cardiac insufficiency.

The compounds according to the invention are prepared by reacting the periplorhamnoside with a ketone in the presence of a dehydrating agent and an acid acting as catalyst at room temperature or at moderately increased temperature and, if desired, by alkylating or acylating under usual conditions the compound thus obtained.

The reaction may take place in an inert solvent such as dioxane, tetrahydrofuran, or preferably in an excess of the carbonyl compound to be reacted.

The usual dehydrating reagents are suited for effecting the ketalization; anhydrous copper sulfate is preferred. For obtaining a good yield it proved advantageous to carry out the reaction, in the presence of an acid, preferably p-toluene-sulfonic-acid-monohydrate. Thus the reaction takes place rapidly and the formation of by-products is almost completely suppressed.

Another variant of the process for preparing the ketal derivatives is the transketalization of suitable dialkylketals by periplorhamnoside in the presence of catalytic amounts of an acid such as p-toluene-sulfonic acid-monohydrate.

The alkylation of the ketal derivatives is affected by a reaction with suitable alkylation agents as, e.g., dialkylsulfates or alkylhalides in the presence of an acid acceptor at room temperature or at moderately increased temperature.

The acylation is affected, according to known methods, with reactive acid derivatives as, e.g., acid halides, acid anhydrides, or mixed anhydrides in an inert solvent in the presence of an acid binding agent at temperatures of 0°–25°C. It is further advantageous to use an excess of pyridine which also serves as solvent.

After work-up in the usual way the products of the process are isolated either by means of chromatographic purification on silica gel or directly by crystallization.

The compounds according to the invention exert a positive-inotropic effect on the heart muscle of various kinds of mammals. They may be used in forms suitable for oral administration or as injection preparations for the treatment of cardiac or circulatory diseases. For this purpose they are processed with carriers and adjuvant substances customary in galenic pharmaceutics and then formed in principally known manner into the desired administration form. Qualified forms are tablets, coated tablets, capsules, suppositories, drops and ampuls. Quantity and frequency of dosage depend on the degree of severity of the case to be treated, with 0.1 to 1.0 mg of active ingredient being recommended as the usual dose.

The following examples serve to illustrate the method for preparing the new compounds according to the invention.

EXAMPLE 1

2',3'-O-isopropylidene-periplorhamnoside

300 Mg of periplorhamnoside are dissolved in 10 ml of distilled acetone and stirred with 1 g of anhydrous copper sulfate and 50 mg of p-toluene-sulfonic acid monohydrate for 3.5 hrs. at room temperature. Subsequently the mixture is filtered, and after addition of 5 % sodium bicarbonate solution, concentrated under reduced pressure. Subsequently the product is extracted with chloroform, the extract washed with water, and following drying and concentration under reduced pressure a colorless foam is obtained which is chromatographed on silica gel (Merck 0.05 – 0.2 mm). Elution with chloroform/methanol 98:2 (v/v) affords 216 mg of product. By reprecipitation from chloroform with petroleum ether 2',3'-O-isopropylidene-periplorhamnoside is obtained as white, amorphous powder, m.p. 145°–148°C.

$C_{32}H_{48}O_9$

| | C 66.64 | H 8.39 | O 24.97 |
|---|---|---|---|
| Calculated: | C 66.64 | H 8.39 | O 24.97 |
| Found: | 66.61 | 8.49 | 24.63 |

IR-spectrum (KBr): inter alia 1776/1736, 1618, 1381, 1075, 1041 cm$^{-1}$

NMR-spectrum (CDCl₃, δ in ppm): 0,89(s,3H), 0,92(s,3H), 1,26(d,3H), 1,34(s,3H), 1,50(s,3H), 4,88(m,2H), 5,10(s,1H), 5,88(m,1H)

EXAMPLE 2

2',3'-O-cyclohexylidene-periplorhamnoside

300 Mg of periplorhamnoside are dissolved in 15 ml of cyclohexanone, mixed with 2 g of anhydrous copper sulfate and 50 mg of p-toluene-sulfonic acid monohydrate. The mixture is stirred at room temperature for 2 hrs., filtered, and the filtrate is taken up with chloroform. The solution is washed first with 5 % sodium bicarbonate solution and then with water. Following drying and concentration under reduced pressure the residue is chromatographed on silica gel (Merck, 0.05 – 0.2 mm). Elution with chloroform and reprecipitation from chloroform/petroleum ether afford 200 mg of cyclohexylidene-periplorhamnoside as white, amorphous powder, m.p. 146°–48°C.

$C_{35}H_{52}O_9 \cdot \frac{1}{2} H_2O$

| | | | |
|---|---|---|---|
| Calc.: | C 67.17 | H 8.52 | O 24.29 |
| Found: | 67.38 | 8.35 | 24.29 |

IR-spectrum (KBr): inter alia 1779/1742, 1621, 1041 cm⁻¹

NMR-spectrum (CDCl₃), δ in ppm): 0,90(s,3H), 0,95(s,3H), 1,27(d,3H), 4,92(m,2H), 5,14(s,1H), 5,90(m,1H)

EXAMPLE 3

4'-O-acetyl-2',3'-O-isopropylidene-periplorhamnoside

150 Mg of isopropylidene-periplorhamnoside (cf. example 1) are dissolved in 5 ml of pyridine and mixed with 5 ml of acetic anhydride. The mixture is allowed to stand overnight at room temperature and is subsequently poured into 50 ml of ice water, and extracted with chloroform. Usual work-up and crystallizing from methanol/water affords 106 mg of crystalline product, m.p. 233°–37°C.

$C_{23}H_{50}O_{10}$

| | | | |
|---|---|---|---|
| Calc.: | C 65.99 | H 8.15 | O 25.86 |
| Found: | 65.85 | 7.84 | 26.05 |

IR-spectrum (KBr): inter alia 1761/1718, 1618, 1376/1364, 1227, 1063, 1037, 1024 cm⁻¹

NMR-spectrum (CDCl₃, δ in ppm): 0.89(s,3H), 0,95(s,3H(, 1,13(d,3H), 1,33(s,3H), 1,55(s,3H), 2,09(s,3H), 4,81(m,1H), 4,86(m,2H), 5,10(s,1H), 5,84(m,1H)

EXAMPLE 4

4'-O-acetyl-2',3'-O-cyclohexylidene-periplorhamnoside 400 mg of cyclohexylidene-periplorhamnoside (cf. example 2) are dissolved in 5 ml of pyridine and mixed with 5 ml of acetic anhydride. The mixture is allowed to stand at room temperature for 12 hrs. is subsequently poured into ice water and the product is extracted with chloroform. Usual work-up and chromatography of the crude product on silica gel (Merck, 0.05 – 0.2 mm; eluent: chloroform) and reprecipitation afford 378 mg of product as white, amorphous powder, m.p. 134°–35°C.

$C_{37}H_{54}O_{10}$

| | | | |
|---|---|---|---|
| Calc.: | C 67.47 | H 8.26 | O 24.29 |
| Found: | 67.69 | 8.22 | 24.44 |

IR-spectrum (KBr): inter alia 1764/1724, 1610, 1362, 1222, 1036 cm⁻¹

NMR-spectrum (CDCl₃), δ in ppm):
 0,85(s,3H), 0,88(s,3H), 1,13(d,3H), 2,09(s,3H), 4,81(m1H), 4,89(m,2H), 5,12(s,1H), 5,85(m,1H)

EXAMPLE 5

4'-O-acetyl-2',3'-O-sec.butylidene-periplorhamnoside

300 Mg of periplorhamnoside are dissolved in 10 ml of methylethylketone and mixed with 2 ml of 2,2-dimethoxybutane and 25 mg of p-toluene-sulfonic acid monohydrate. The mixture is stirred for 1 hour at room temperature, neutralized with 5 % aqueous sodium bicarbonate solution, concentrated under reduced pressure and extracted with chloroform. After drying and concentration the ketal formed is dissolved in 5 ml of pyridine and mixed with 5 ml of acetic anhydride. The product is allowed to stand overnight and processed as described in example 3. After chromatography on silica gel and reprecipitation from chloroform/petroleum ether 184 mg of product are obtained as amorphous, white powder, m.p. 126°–29°C.

$C_{35}H_{52}O_{10}$

| | | | |
|---|---|---|---|
| Calc.: | C 66.43 | H 8.28 | O 25.29 |
| Found: | 66.50 | 7.97 | 25.27 |

IR-spectrum (KBr): inter alia 1767/1730, 1613, 1370, 1225, 1035cm⁻¹

NMR-spectrum (CDCl₃, δ in ppm): 0,89(s,3H), 0,95(s,3H), 1,16(d,3H), 2,10 (s,3H), 4,84(m,1H), 4,90(m,2H), 5,11(s,1H), 5,86(m,1H)

What is claimed is:

1. Periplorhamnoside derivatives of the formula:

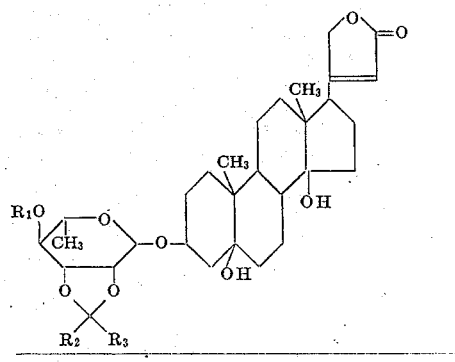

wherein $R_1$ is selected from the group consisting of hydrogen, methyl, ethyl, methoxy-methyl, ethoxy-methyl, and the acyl residue of a carboxylic acid with 1 to 5 carbon atoms; and wherein $R_2$ and $R_3$ taken individually are lower alkyls, or taken together is a 5 or 6 membered alicyclic ring.

2. Wherein the derivatives of claim 1 is 2',3'-O-isopropylideneperiplorhamnoside.

3. Wherein the derivatives of claim 1 is 2',3'-O-cyclohexylidene periplorhamnoside.

4. Wherein the derivatives of claim 1 is 4'-O-acetyl-2',3'-O-isopropylidene-periplorhamnoside.

5. Wherein the derivatives of claim 1 is 4'-O-acetyl-2',3'-O-cyclohexylidene-periplorhamoside.

6. Wherein the derivatives of claim 1 is 4'-O-acetyl-2',3'-o- sec. butylidene-periplorhamnoside.

* * * * *